United States Patent [19]

Milstead et al.

[11] 4,286,794
[45] Sep. 1, 1981

[54] PROTECTIVE FLEXIBLE SEALED ENCLOSURE FOR A STEERABLE DRIVE WHEEL OF A VEHICLE

[76] Inventors: Charles W. Milstead, Rte. 6, Box 252; Larry Ridenour, Rte. 6, Box 8, both of McMinnville, Tenn. 37110

[21] Appl. No.: 50,471

[22] Filed: Jun. 20, 1979

[51] Int. Cl.³ .............................................. F16D 3/84
[52] U.S. Cl. ............................ 277/212 FB; 64/32 F; 74/18.1
[58] Field of Search ................. 74/607, 18.1, 18, 18.2; 403/50, 288, 57, 58; 285/226; 64/32 F; 277/212 FB

[56] References Cited

U.S. PATENT DOCUMENTS

| 1,352,019 | 9/1920 | Murphy | 64/32 F |
|---|---|---|---|
| 2,473,618 | 6/1949 | Stillwagon, Jr. | 64/32 F |
| 3,388,705 | 6/1968 | Grosshandler | 285/226 X |
| 3,795,118 | 3/1974 | Kesl et al. | 64/32 F |
| 3,830,083 | 8/1974 | Hadick et al. | 64/32 F |
| 4,107,952 | 8/1978 | Geisthoff | 64/32 F |

FOREIGN PATENT DOCUMENTS 1285800 12/1968 Fed. Rep. of Germany ........... 285/226

*Primary Examiner*—Thomas F. Callaghan
*Attorney, Agent, or Firm*—Barry L. Haley

[57] ABSTRACT

A sealed, flexible enclosure for protecting the universal joint, the wheel bearing, and axle opening for a steerable, drive wheel of a vehicle. The enclosure is mounted between the inside wheel backing plate and the axle tube opening of the vehicle, which prevents water, dirt, mud or other deleterious materials from contacting seals, wheel bearings, universal joints and axle seals. The enclosure includes a molded, cylinderical rubber housing having a pleated wall portion that is bonded at one end to a rigid tube-shaped sleeve. The molded rubber housing has a flanged peripheral lip at one end that includes apertures for mounting the lip with a metal ring to threaded studs on the wheel backing plate. The rigid sleeve, bonded at one end to the flexible housing, is sized across one end diameter to form a sealed connection within the axle tube of the vehicle. The pleated, flexible wall surface of the housing allows for relative angular movement along the longitudinal axis of the housing on either side (expansion and contraction) caused by movement of the wheel in either direction during steering. The device is especially useful for adaptation on a four wheel drive vehicle.

2 Claims, 8 Drawing Figures

PROTECTIVE FLEXIBLE SEALED ENCLOSURE FOR A STEERABLE DRIVE WHEEL OF A VEHICLE

BACKGROUND OF THE INVENTION

This invention relates to a sealed enclosure for protecting the universal joint, wheel bearing, and front gear box found on a front wheel drive or four wheel drive vehicle.

In a conventional four wheel drive vehicle, each front steerable wheel is also connected by a drive axle to the vehicle motor through a universal joint. Because of pivotal wheel movement during steering, no rigid axle tube is provided at the wheel housing. As a result, seals are often employed which require periodic replacement. A seal failure can result in water, mud or dirt being received in a wheel bearing or a gear box, causing more damage to the vehicle.

The present invention provides a sealed enclosure that eliminates the need for some conventional seals and improves performance of other seals that must be periodically replaced and that protects the axle wheel bearings, universal joints and gear box on a four wheel drive vehicle from harmful elements, reducing maintenance costs and problems. The present invention may be readily attached to a conventional vehicle with little or no modification of the drive axle or wheel mount.

BRIEF DESCRIPTION OF THE INVENTION

A protective enclosure for the universal joint, axle tube opening and the wheel backing plate of a steerable drive wheel of a vehicle comprising a flexible, cylindrically-shaped housing made of a natural or synthetic rubber or rubber-like material bonded at one end to a rigid tube-like sleeve, the end of which is sized in diameter to be received in an axle tube opening.

The flexible housing includes accordian-like pleated wall sections on lateral sides to allow angular movement of the end face of the flexible housing (which is attached to the wheel backing plate) relative to the longitudinal axis of the housing. The end face of the flexible housing that is mounted on the wheel backing plate includes a peripheral lip that receives a metal covering ring to allow mounting of the ring and peripheral lip on threaded studs attached to the wheel backing plate. The conventional studs already present on most wheels need to be replaced with new studs to achieve the mounting of the housing.

The rigid tube-like sleeve is sized to be received in a sealed relationship inside the axle tube at one end, while the other end is bonded firmly to the flexible housing. The sleeve may include two sections of different end diameters with an intermediate wall portion that abuts the face of the axle tube opening. Additionally, peripheral flanges may be included on the sleeve portion that fits within the tube for forming a better seal between the sleeve and the axle tube. The other portion of the sleeve has a diameter that is equal to that of the housing itself and may include a recessed lip portion at the point of bonding for a more firm attachment between the flexible housing and the sleeve itself. The sleeve may be constructed of a rigid plastic, metal, or other suitable material.

In one embodiment, for use on the front wheels of a conventional four wheel drive vehicle, the enclosure (one for each steerable wheel) is mounted over the universal joint, being attached to the wheel backing plate at one end, while the rigid sleeve is inserted in a sealed relationship into the open end of the axle tube itself. The pleated lateral walls of the housing are sized such to permit full movement of each front wheel in either direction in accordance with particular distances required without in any way rupturing or abnormally distorting the enclosed wall. The enclosure periphery is also sized such that it does not rub or bind on any of the other parts adjacent to the enclosure.

Although the device has been shown for a four wheel drive vehicle, the principle may be embodied for a front wheel drive vehicle or any type of vehicle where the steerable wheel is also a drive wheel. Although the device is described as using a rubber or rubber-like material for the housing, any flexible, preferably moldable material will be suitable.

It is an object of this invention to provide a protective enclosure that is useful on a four wheel drive vehicle for protecting the steerable wheel bearings, the axle opening, and the universal joint from deleterious materials.

It is another object of this invention to provide an enclosure for a four wheel drive universal joint that reduces or eliminates the need for conventional, replaceable seals normally found on such vehicles.

And yet still another object of this invention is to provide a sealed enclosure that permits movement of a wheel without rupturing the sealed enclosure.

In accordance with these and other objects which will be apparent hereinafter, the instant invention will now be described with particular reference to the accompanying drawings.

PREFERRED EMBODIMENT OF THE INVENTION

Figure 1:
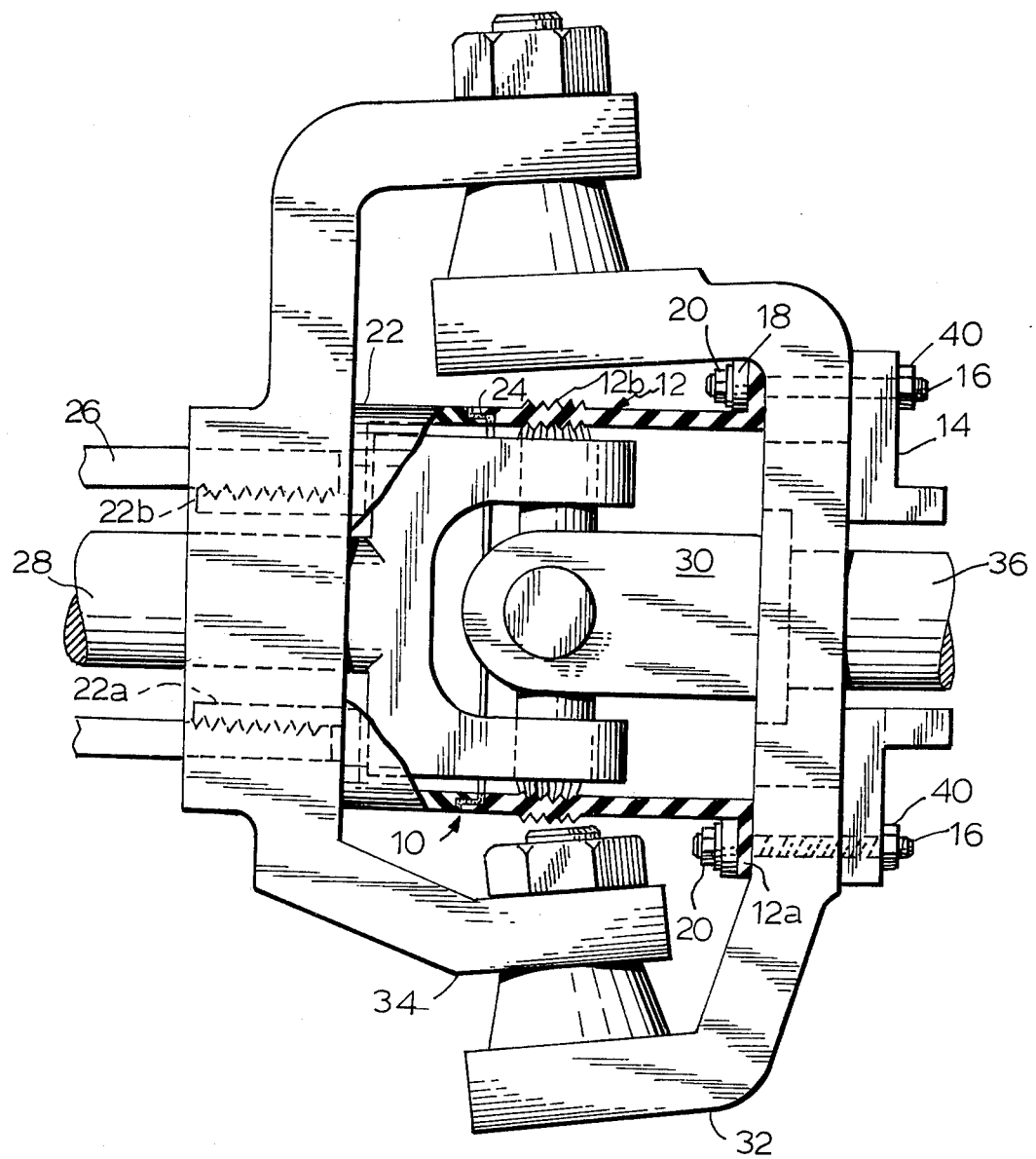
FIG. 1 is a front elevational view showing a portion of the front (steerable) wheel axle on a four wheel drive unit that has the instant invention mounted therein.

Referring now to the drawings and specifically FIG. 1, the instant invention is shown generally at 10 mounted between axle tube 26 at one end and wheel backing plate 14. The wheel-side axle shaft 36 is shown connected through a universal joint 30 to the inside axle shaft 28. The steering and mounting arms 32 and 34 as shown are conventional and do not form a part of the invention.

Figure 2:
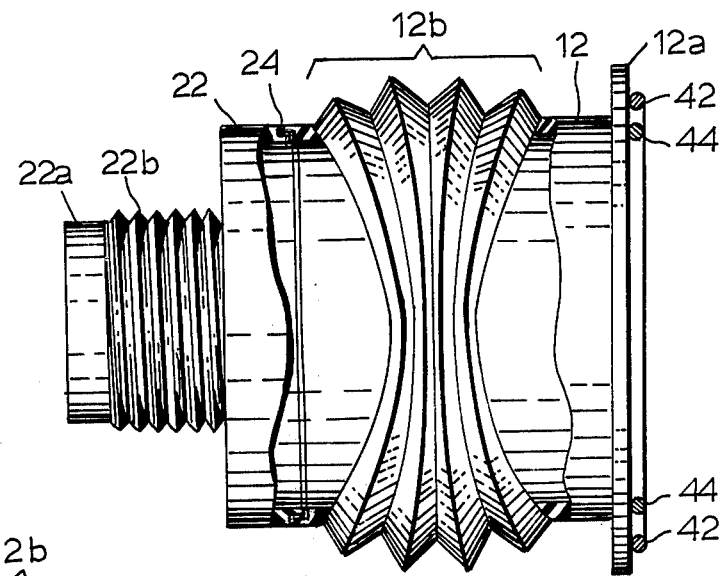
FIG. 2 is a top plan view of the instant invention.

Referring now to FIG. 2, the invention is shown comprised of a molded rubber or rubber-like housing 12 having a peripheral lip 12a disposed at one end (which is ultimately mounted on the wheel backing plate) and the pleated wall section 12b on each lateral side of the housing. A plastic sleeve 22 is bonded by a suitable adhesive 24 to the flexible housing 12 along the bonding lines 24. A sleeve 22 includes a smaller diameter portion 22a which is received into the axle tube opening. The smaller diameter portion has exterior concentric peripheral flanges 22b for providing a sealed connection between the sleeve and the axle tube.

Figure 4:
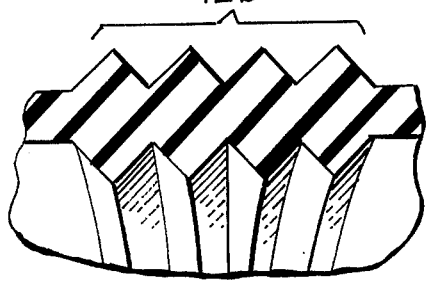
FIG. 4 shows a fragmentary cross-sectional view in elevation of the pleated wall portion of the instant invention.
Figure 3:
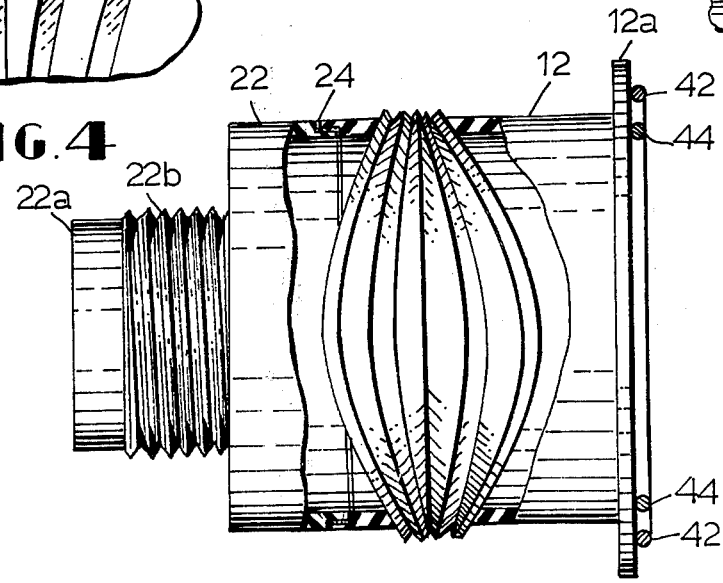
FIG. 3 is a front elevational view of the instant invention as it would appear from the forward part of a vehicle as mounted on the left front wheel axle assembly.

FIG. 3 shows the separated wide pleated portion 12b of the wall of the flexible housing 12. FIG. 4 shows a portion of the pleated wall structure that allows for expansion or contraction and movement between the plastic sleeve and the end of the housing. Referring back to the top view shown in FIG. 2, the pleated portion 12b is such that the pleats are sufficiently sized to permit pivotal movement along the longitudinal axis of the housing so that the lip 12a connected to the wheel backing plate can angularly move in either direction as the pleats expand or contract, depending on the direction of movement of the wheel. FIG. 3 shows an additional modification with circular sealing flanges 42 and 44 disposed on the face of lip 12a that engage the backing plate to act as an "O"-ring like seal between the housing and the backing plate.

Figure 5:
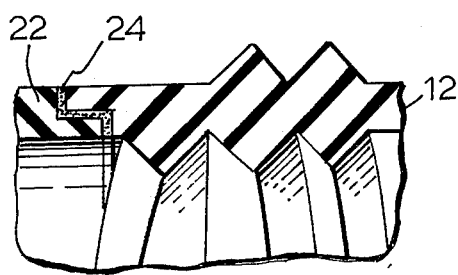
FIG. 5 shows a cross-sectional view of the bonding between the plastic sleeves and the flexible housing utilized in the instant invention.

FIG. 5 shows how the plastic sleeve 22 which has a recessed end portion is bonded by adhesive 24 to the molded housing 12.

Figure 6:
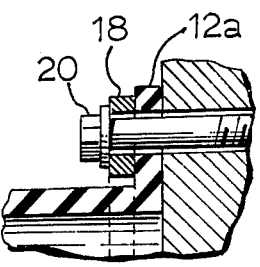
FIG. 6 shows a fragmentary side elevational view in cross-section showing the mounting lip and metal ring for mounting the flexible housing to the wheel backing plate.

FIG. 6 shows a metal ring 18 which is mounted behind the lip 12a by a nut and washer 20 on a threaded stud from the wheel backing plate. Suitable apertures in the lip 12a permit the threaded stud to pass through a lip to allow attachment by a nut 20.

Figure 7A:
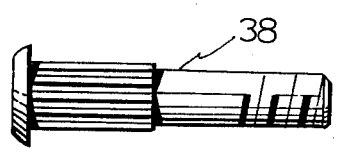
FIGS. 7a and 7b show a conventional stud compared to a modified stud used in the present invention.
Figure 7B:
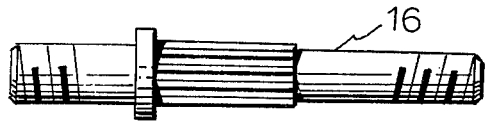

FIG. 7b shows the enlargement of stud 16 and its modification to accomodate the additional thickness of lip 12a and mounting ring 18, as compared to conventional stud 38.

Referring back to FIG. 1, the invention is shown mounted in a conventional four wheel drive front axle assembly. The invention may be mounted at the factory during the assembly of the vehicle or may be mounted on a conventional vehicle already assembled. The only modification required for mounting it on a presently assembled vehicle is to installed enlarged threaded studs 16 within the wheel backing plate 14 to accommodate the additional thickness of the metal ring and the instant invention.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A sealed enclosure mounted between a steerable wheel on a vehicle and a drive axle tube, for protecting the universal joint, the wheel housing, and the drive axle opening for a steerable drive wheel of a vehicle, the enclosure comprising:

a substantially cylindrical housing, said housing including a flexible wall portion to allow angular movement of one end of said housing relative to the longitudinal axis of the housing, said flexible wall portion of said housing having spaced apart pre molded pleated wall segments along opposite lateral sides of the housing, said pleated wall segments being disposed between cylindrical portions of said housing and being expandable and contractable along the lateral sides of the housing to allow angular movement of one end of the housing relative to the longitudinal axis of the housing;

a rigid sleeve adhesively bounded to one end of said housing, said sleeve having first and second connected tubular sections, said first tubular section having a larger diameter than said second tubular section, said first tubular section being sized in diameter at substantially the same diameter of said cylindrical flexible housing and adhesively joined thereto, said second tubular section being sized for a sealed fit within said axle tube, said second tubular section having exterior concentric peripheral flanges for providing a better seal between the second tubular section and the axle tube; and means disposed at the other end of said housing for attaching said housing to said steerable wheel including a peripheral lip disposed in a plane perpendicular to the longitudinal axis of said flexible housing at the end opposite the end connected to said rigid sleeve, said peripheral lip being integrally formed with said flexible housing and sized for flush engagement with a rigid ring which is used to attach said housing to said steerable wheel.

2. A sealed enclosure as in claim 1, wherein:

said means for attaching the other end of said housing to said steerable wheel includes a rigid ring having a plurality of apertures disposed therein; and a plurality of enlarged studs disposed through said apertures in said ring and connected into a wheel backing plate on the steerable wheel.

* * * * *